(12) United States Patent
Sokulin et al.

(10) Patent No.: US 12,437,859 B2
(45) Date of Patent: Oct. 7, 2025

(54) METHODS AND SYSTEMS FOR REVIEWING ULTRASOUND IMAGES

(71) Applicant: General Electric Company, Schenectady, NY (US)

(72) Inventors: Elina Sokulin, Tirat Carmel (IL); Olivier Gerard, Oslo (NO); Svein Arne Aase, Trondheim (NO)

(73) Assignee: General Electric Company

( * ) Notice: Subject to any disclaimer, the term of this patent is extended or adjusted under 35 U.S.C. 154(b) by 1632 days.

(21) Appl. No.: 15/642,029

(22) Filed: Jul. 5, 2017

(65) Prior Publication Data
US 2019/0012432 A1 Jan. 10, 2019

(51) Int. Cl.
*G16H 30/40* (2018.01)
*A61B 8/00* (2006.01)
*A61B 8/08* (2006.01)
*G06T 7/00* (2017.01)

(52) U.S. Cl.
CPC ............ *G16H 30/40* (2018.01); *A61B 8/08* (2013.01); *A61B 8/0808* (2013.01); *A61B 8/085* (2013.01); *A61B 8/0875* (2013.01); *A61B 8/0883* (2013.01); *A61B 8/0891* (2013.01); *A61B 8/463* (2013.01); *A61B 8/465* (2013.01); *A61B 8/5223* (2013.01); *A61B 8/54* (2013.01); *G06T 7/0012* (2013.01); *G06T 2200/24* (2013.01); *G06T 2207/10132* (2013.01)

(58) Field of Classification Search
CPC .......... A61B 8/08; A61B 8/085; A61B 8/463; A61B 8/5223; G06F 19/321; G06T 2207/10132; G16H 30/00; G16H 30/20; G16H 30/40
See application file for complete search history.

(56) References Cited

U.S. PATENT DOCUMENTS

| 7,146,031 | B1* | 12/2006 | Hartman | G06T 7/0012 |
| | | | | 382/132 |
| 10,192,032 | B2 | 1/2019 | Himsl et al. | |
| 2004/0077952 | A1* | 4/2004 | Rafter | A61B 6/563 |
| | | | | 600/481 |
| 2006/0239573 | A1 | 10/2006 | Novatzky et al. | |
| 2007/0055153 | A1* | 3/2007 | Simopoulos | G16H 30/40 |
| | | | | 600/437 |
| 2007/0081707 | A1* | 4/2007 | Sirohey | G16Z 99/00 |
| | | | | 382/128 |
| 2008/0154123 | A1* | 6/2008 | Jackson | A61B 5/062 |
| | | | | 600/424 |
| 2010/0211409 | A1* | 8/2010 | Kotula | G06Q 10/06 |
| | | | | 705/3 |

(Continued)

Primary Examiner — Keith M Raymond
Assistant Examiner — Milton Truong
(74) Attorney, Agent, or Firm — Dean D. Small; The Small Patent Law Group, LLC (57) ABSTRACT

The systems and methods described herein generally relate to reviewing ultrasound images between different ultrasound exams. The systems and methods acquire a plurality of ultrasound images of an anatomical structure during a first ultrasound exam based on ultrasound data received from an ultrasound probe, analyze the ultrasound images to identify an anatomical characteristic in the ultrasound images, group the ultrasound images into groups based on the anatomical characteristics, and display at least one group of the ultrasound image on a graphical user interface (GUI).

17 Claims, 5 Drawing Sheets

(56) References Cited

U.S. PATENT DOCUMENTS

| | | | |
|---|---|---|---|
| 2013/0102899 A1* | 4/2013 | Vezina | A61B 8/065 600/450 |
| 2013/0184584 A1* | 7/2013 | Berkey | A61B 8/5292 600/441 |
| 2015/0051489 A1* | 2/2015 | Caluser | A61B 8/0825 600/440 |
| 2015/0182191 A1* | 7/2015 | Caluser | A61B 5/055 600/440 |
| 2017/0038951 A1* | 2/2017 | Reicher | G06F 16/583 |
| 2017/0046483 A1* | 2/2017 | Reicher | G06F 16/245 |
| 2017/0360412 A1* | 12/2017 | Rothberg | A61B 8/085 |
| 2019/0125298 A1* | 5/2019 | Abolmaesumi | G06N 3/08 |
| 2019/0385307 A1* | 12/2019 | Yaqub | G06K 9/6857 |

* cited by examiner

METHODS AND SYSTEMS FOR REVIEWING ULTRASOUND IMAGES

FIELD

Embodiments described herein generally relate to reviewing ultrasound images within and/or during different ultrasound exams.

BACKGROUND OF THE INVENTION

During an ultrasound exam a series of ultrasound images (e.g., over fifty images) are acquired. As part of a protocol, the clinician (e.g., sonographer, doctor, nurse) may take measurements from the ultrasound images, review the ultrasound images, and/or prepare a diagnosis report. The review of the ultrasound images by the clinician includes determining, which of the ultrasound images can be used to diagnose and/or answer questions regarding a pathology of interest. Once the ultrasound images are selected, the selected ultrasound images are labeled and used to perform anatomical measurements. Optionally, the anatomical measurements may be performed on ultrasound images prior to being labeled. However, the clinician currently manually selects ultrasound images increasing an amount of time to perform the diagnosis report. Additionally, the clinician may select ultrasound images that do not match and/or mischaracterize the group.

BRIEF DESCRIPTION OF THE INVENTION

In an embodiment, a method (e.g., for grouping a plurality of ultrasound images acquired during an ultrasound exam) is provided. The method includes acquiring a plurality of ultrasound images of an anatomical structure during a first ultrasound exam based on ultrasound data received from an ultrasound probe, analyzing the ultrasound images to identify an anatomical characteristic in the ultrasound images, grouping the ultrasound images into groups based on the anatomical characteristics, and displaying at least one group of the ultrasound image on a graphical user interface (GUI).

In an embodiment, a system (e.g., medical imaging system) is provided. The system includes an ultrasound probe configured to acquire ultrasound data of an anatomical structure, a display, and a controller circuit. The controller circuit is configured to acquire a plurality of ultrasound images during a first ultrasound exam based on ultrasound data received from an ultrasound probe, analyze the ultrasound images to identify an anatomical characteristic in the ultrasound images, group the ultrasound images into groups based on the anatomical characteristics, and display at least one group on a graphical user interface (GUI).

In an embodiment, a tangible and non-transitory computer readable medium is provided. The tangible and non-transitory computer readable medium includes one or more programmed instructions configured to direct one or more processors. The one or more processors are directed to acquire a plurality of ultrasound images during a first ultrasound exam based on ultrasound data received from an ultrasound probe, analyze the ultrasound images to identify an anatomical characteristic in the ultrasound images, group the ultrasound images into groups based on the anatomical characteristics, and display at least one group on a graphical user interface (GUI).

DETAILED DESCRIPTION OF THE INVENTION

The following detailed description of certain embodiments will be better understood when read in conjunction with the appended drawings. To the extent that the figures illustrate diagrams of the functional modules of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various embodiments described herein generally relate to grouping ultrasound images acquired during an ultrasound exam. For example, a medical imaging system is provided herein. The medical imaging system is configured to group acquired ultrasound images based on a pathology of interest, a clinical diagnosis, field of views of an anatomical structure, and/or the like. Optionally, the grouping of the ultrasound images by the medical imaging system is based on a user selection from a user interface, a protocol, and/or the like. Additionally or alternatively, the medical imaging system may determine differences in the pathology of interest, an anatomical measurement of interest, or a field of view between ultrasound exams.

A technical effect of at least one embodiment described herein reduces a mischaracterization or misclassification of ultrasound images acquired during the ultrasound exam. A technical effect of at least one embodiment described herein enables a user to group ultrasound images automatically based on a pathology of interest. A technical effect of at least one embodiment described herein reduces an amount of time for the clinician to generate a diagnosis report.

Terms

The term "view window" for an ultrasound image refers to a view position, direction and/or orientation of the ultrasound image as captured by an ultrasound probe. Non-limiting examples of view windows include the parasternal view (e.g., long axis view, short axis view), apical view (e.g., 2 chamber view, 3 chamber view, 4 chamber view, 5 chamber view), and subcostal views (e.g., 4 chamber view, short axis view, inferior vena cava view). Ultrasound images with different view windows can be captured for a particular anatomical structure by adjusting the position, directional alignment and orientation of the ultrasound probe, which similarly adjusts the position, directional alignment and orientation of the field of view for the transducer(s) of the ultrasound probe.

The term "ultrasound exam" refers to an acquisition of one or more ultrasound images of one or more anatomical structures. The ultrasound exam can represent a continuous and/or discontinuous acquisition of the one or more ultrasound images (e.g., 2D, 3D, 4D) during a scan of a patient. The scan of the patient may last up to a minute and/or an hour. Optionally, the ultrasound exam can be based on one or more protocols.

The term "anatomical structure" refers to an anatomical part of a patient. The anatomical structure includes an organ (e.g., heart, kidney, lung, liver, bladder, brain, neonatal brain, embryo, abdomen, and/or the like), vascular structure (e.g., vein, artery, mitral valve, aortic valve, tricuspid valve, pulmonary valve), tissue or portion of an organ (e.g., breast tissue, liver tissue, brain tissue, cardiac tissue, prostate tissue, and/or the like), skeletal structure, and/or the like. The anatomical structure is indicative of a pathology of interest, an anatomical function, and/or the like.

The term "anatomical characteristic" refers to a structural feature of the anatomical structure. Non-limiting examples of anatomical characteristics include dimensions (e.g., height, length, width, depth), a shape, a boundary dimension (e.g., thickness, shape), a number of cavities or chambers, fiducial markers, and/or the like.

The term "anatomical measurement" refers to a measurement of the anatomical characteristic and/or the anatomical structure shown in an ultrasound image. The anatomical measurement may represent a volume, an area, a surface area, a wall thickness, a dimension, a blood flow, and/or the like.

The term "pathology of interest" refers to a portion of the anatomical structure having an irregular and/or structural deviation relative to a healthy anatomical structure. The pathology of interest represents the portion of the anatomical structure having a disease or illness. The pathology of interest may correspond to the portion of the anatomical structure having valvular stenosis, valvular insufficiency, valve regurgitation, arthritis, kidney stones, cancer, an obstruction, fetal abnormalities, and/or the like.

The term "candidate trend" refers to a change in the pathology of interest or an anatomical measurement between two or more ultrasound exams of a patient. The ultrasound exams may occur at different times. The candidate trend is indicative of a change in the anatomical structure, where the change is associated with the pathology of interest and/or a change in the anatomical measurement. Non-limiting examples of candidate trends represent a change in blood flow, dimensions of the anatomical structure or the anatomical characteristic, and/or the like.

The term "protocol" refers to a predefined method of acquiring ultrasound images and/or anatomical measurements of the anatomical structure. The protocol may define particular view window to be used when acquiring ultrasound images or an anatomical structure. Additionally or alternatively, the protocol defines one or more anatomical measurements to be obtained for select ultrasound images.

The protocol may be pre-defined based on the pathology of interest, anatomical structure, clinical diagnosis, and/or the like. Optionally, the protocol may be defined by the clinician, received from a remote server, pre-defined by the medical imaging system, and/or the like.

The term "clinical diagnosis" refers to a process of determining a disease and/or condition for symptoms of a patient. The process includes identifying an anatomical function that is performed and/or enabled by the anatomical structure. The clinician assesses the anatomical function to identify the disease and/or the condition. Non-limiting examples of anatomical functions are a cardiovascular function (e.g., diastolic function, systolic function, cardiac cycle), a renal function, a digestive function, a metabolic function, a detoxification function, and/or the like. The process can represent a decision tree. The decision tree includes acquisition of ultrasound images having view windows, anatomical measurements of the ultrasound images, and/or the like to enable the clinician to assess the anatomical function. Optionally, the process is included in the protocol for the clinical diagnosis.

The term "real time" or "real-time" refers to a process performed by the medical imaging system (e.g., a controller circuit) while scanning a patient and/or during an ultrasound exam, and may vary based on a processing speed and/or operating specification (e.g., no intentional lag or delay). Real time includes updating an ultrasound image shown on the display after each ultrasound pulse within a scan and/or after each ultrasound scan sequence. Additionally or alternatively, ultrasound data may be stored temporarily in memory of the medical imaging system during the ultrasound exam and processed in a live or off-line operation.

The term "machine learning algorithm" refers to an algorithm that is adjusted over multiple iterations from received observations and/or data. The machine learning algorithm represents a form of artificial intelligence that learns from the observations and/or data. For example, the machine learning algorithm is adjusted by supervised learning, unsupervised learning, and/or reinforcement learning. Non-limiting examples of machine learning algorithms are a decision tree, K-means, deep learning, artificial neural network, and/or the like.

The term "image analysis algorithm" refers to a machine learning algorithm that has been trained to identify an anatomical structure, anatomical characteristics, and/or a view window of the anatomical structure of an ultrasound image.

Figure 1:
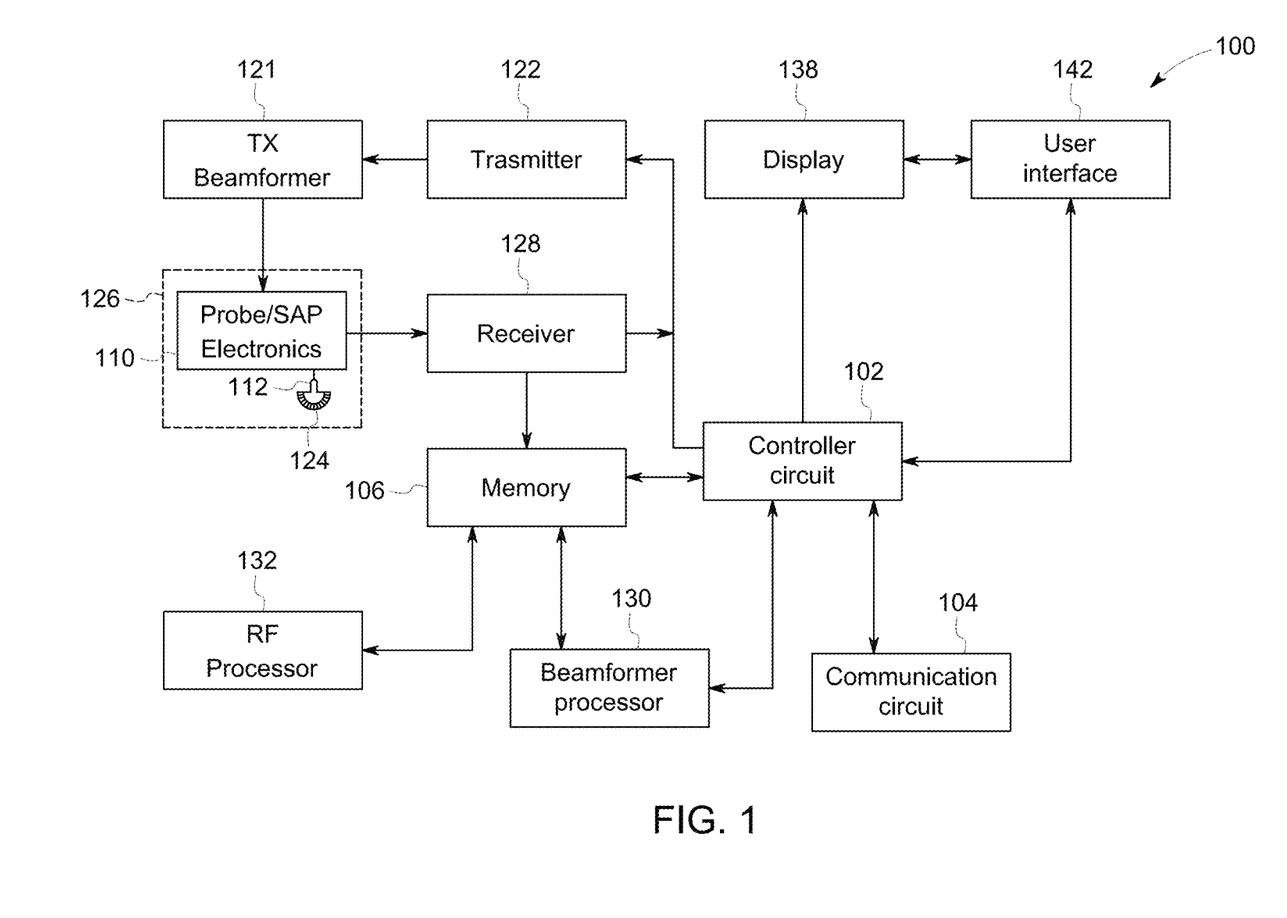
FIG. 1 illustrates a schematic block diagram of an embodiment of a medical imaging system.

FIG. 1 illustrates a schematic block diagram of an embodiment of a medical imaging system 100. For example, the medical imaging system 100 is shown as an ultrasound imaging system. The medical imaging system 100 may include a controller circuit 102 operably coupled to a communication circuit 104, a display 138, a user interface 142, an ultrasound probe 126, and a memory 106.

The controller circuit 102 is configured to control the operation of the medical imaging system 100. The controller circuit 102 may include one or more processors. Optionally, the controller circuit 102 may include a central processing unit (CPU), one or more microprocessors, a graphics processing unit (GPU), or any other electronic component capable of processing inputted data according to specific logical instructions. Optionally, the controller circuit 102 may include and/or represent one or more hardware circuits or circuitry that include, are connected with, or that both include and are connected with one or more processors, controllers, and/or other hardware logic-based devices. Additionally or alternatively, the controller circuit 102 may execute instructions stored on a tangible and non-transitory computer readable medium (e.g., the memory 106).

The controller circuit 102 may be operably coupled to and/or control a communication circuit 104. The communication circuit 104 is configured to receive and/or transmit information with one or more alternative medical imaging systems, a remote server, and/or the like along a uni-directional and/or bi-directional communication link. The remote server may represent a database that includes patient information, machine learning algorithms, remotely stored ultrasound images from prior ultrasound exams of a patient, and/or the like. The communication circuit 104 may represent hardware that is used to transmit and/or receive data along the uni-directional and/or bi-directional communication link. The communication circuit 104 may include a transceiver, receiver, transceiver and/or the like and associated circuitry (e.g., antennas) for wired and/or wirelessly communicating (e.g., transmitting and/or receiving) with the one or more alternative medical imaging systems, the remote server, and/or the like. For example, protocol firmware for transmitting and/or receiving data along the uni-directional and/or bi-directional communication link may be stored in the memory 106, which is accessed by the controller circuit 102. The protocol firmware provides the network protocol syntax for the controller circuit 102 to assemble data packets, establish and/or partition data received along the bi-directional communication links, and/or the like.

The uni-directional and/or bi-directional communication links may be a wired (e.g., via a physical conductor) and/or wireless communication (e.g., utilizing radio frequency (RF)) link for exchanging data (e.g., data packets) between the one or more alternative medical imaging systems, the remote server, and/or the like. The bi-directional communication links may be based on a customized communication protocol and/or a standard communication protocol, such as Ethernet, TCP/IP, WiFi, 802.11, Bluetooth, and/or the like.

The controller circuit 102 is operably coupled to the display 138 and the user interface 142. The display 138 may include one or more liquid crystal displays (e.g., light emitting diode (LED) backlight), organic light emitting diode (OLED) displays, plasma displays, CRT displays, and/or the like. The display 138 may display patient information, one or more ultrasound images and/or videos, components of a graphical user interface, one or more 2D, 3D, or 4D ultrasound image data sets from ultrasound data stored in the memory 106 or currently being acquired in real-time, anatomical measurements, diagnosis, treatment information, tags, and/or the like received by the display 138 from the controller circuit 102.

The user interface 142 controls operations of the controller circuit 102 and the medical imaging system 100. The user interface 142 is configured to receive inputs from the clinician and/or operator of the medical imaging system 100. The user interface 142 may include a keyboard, a mouse, a touchpad, one or more physical buttons, and/or the like. Optionally, the display 138 may be a touch screen display, which includes at least a portion of the user interface 142. For example, a portion of the user interface 142 may correspond to a graphical user interface (GUI) generated by the controller circuit 102, which is shown on the display 138. The touch screen display can detect a presence of a touch from the operator on the display 138 and can also identify a location of the touch with respect to a surface area of the display 138. For example, the user may select one or more user interface components of the GUI shown on the display by touching or making contact with the display 138. The user interface components may correspond to graphical icons, textual boxes, menu bars, and/or the like shown on the display 138. The user interface components may be selected, manipulated, utilized, interacted with, and/or the like by the clinician to instruct the controller circuit 102 to perform one or more operations as described herein. The touch may be applied by, for example, at least one of an individual's hand, glove, stylus, and/or the like.

The memory 106 includes parameters, algorithms, protocols of one or more ultrasound exams, data values, and/or the like utilized by the controller circuit 102 to perform one or more operations described herein. The memory 106 may be a tangible and non-transitory computer readable medium such as flash memory, RAM, ROM, EEPROM, and/or the like.

The memory 106 may include an image analysis algorithm. The controller circuit 102 executes the image analysis algorithm to identify the anatomical characteristics in the ultrasound image, and the FOV of the anatomical structure. Optionally, the image analysis algorithm may be received along one of the uni-directional and/or bi-directional communication links via the communication circuit 104 and stored in the memory 106.

The image analysis algorithm may be defined by one or more machine learning algorithms to identify the anatomical structure in the ultrasound image based on the anatomical characteristic. Additionally or alternatively, the image analysis algorithm is configured to determine a view window of the anatomical structure. The image analysis algorithm may be executed by the controller circuit 102 as the ultrasound images are acquired (e.g., in real-time) by the medical imaging system 100.

Optionally, the image analysis algorithm utilizes a pixel and/or voxel analysis of the ultrasound image. For example, the anatomical characteristic is identified by the controller circuit 102 based on features of the pixels and/or voxels in the ultrasound image. The features of the pixels and/or voxels is identified by the controller circuit 102 using histogram orient gradients, blob features, covariance features, binary pattern features, and/or the like. The image analysis algorithm may correspond to an artificial neural network formed by the controller circuit 102 and/or the remote server. The image analysis algorithm may be divided into a plurality of artificial neural layers. The artificial neural layers may represent different functions and/or outputs of the image analysis algorithm. For example, the artificial neural layers include an input layer configured to receive an input image, an output layer configured to identify the anatomical structure of the input image, a view window layer, and/or one or more intermediate layers. The artificial neural layers represent different groups or sets of artificial neurons, which can represent different functions performed by the controller circuit 102 on the ultrasound image. The artificial neurons in the layers are configured to examine individual pixels in the ultrasound image. The artificial neurons apply different weights in the functions applied to the ultrasound image to attempt to identify the anatomical structure. The image analysis algorithm identifies the anatomical structure by assigning or associating different pixels in the ultrasound image with different anatomical characteristics based on analysis of the pixels.

Additionally or alternatively, the image analysis algorithm uses a classification algorithm to identify the anatomical characteristic. For example, the classification algorithm identifies one or more anatomical characteristics in the ultrasound image. The identification of the one or more anatomical characteristics can be based on a size, a shape, and/or the like. The classification algorithm classifies (e.g., random forest classifier, principal component analysis, and/or that like) the one or more anatomical characteristics into a plurality of categories or classes.

The controller circuit 102 may determine the view window of the anatomical structure. The controller circuit 102 determines the view window based on one or more of the anatomical characteristics. For example, controller circuit 102 identifies an orientation and/or spatial position of the one or more anatomical characteristics within the ultrasound image. The controller circuit 102 determines the view window based on the orientation and/or spatial position of the one or more anatomical characteristics with respect to each other. The spatial position may include a distance(s) and/or relation between at least two of the anatomical characteristics. Change in the spacing between at least two anatomical characteristics may occur when the anatomical structure is not perpendicular to the view window of the transducer array 112.

Additionally or alternatively, the image analysis algorithm is configured to identify one or more of the anatomical characteristics independent of the ultrasound image mode. For example, the image analysis algorithm is configured to identify one or more of the anatomical characteristics of a color flow ultrasound image, a B-mode ultrasound image, a C-mode ultrasound image, an M-mode ultrasound image, and/or the like.

The ultrasound probe 126 may have a transmitter 122, transmit beamformer 121 and probe/SAP electronics 110. The probe/SAP electronics 110 may be used to control the switching of the transducer elements 124. The probe/SAP electronics 110 may also be used to group transducer elements 124 into one or more sub-apertures. The ultrasound probe 126 may be configured to acquire ultrasound data or information from the anatomical structure of the patient. The ultrasound probe 126 is communicatively coupled to the controller circuit 102 via the transmitter 122. The transmitter 122 transmits a signal to a transmit beamformer 121 based on acquisition settings received by the controller circuit 102. The acquisition settings may define an amplitude, pulse width, frequency, gain setting, scan angle, power, time gain compensation (TGC), resolution, and/or the like of the ultrasonic pulses emitted by the transducer elements 124. The transducer elements 124 emit pulsed ultrasonic signals into the patient (e.g., a body). The acquisition settings may be defined by the user operating the user interface 142. The signal transmitted by the transmitter 122 in turn drives a plurality of transducer elements 124 within a transducer array 112.

The transducer elements 124 emit pulsed ultrasonic signals into a body (e.g., patient) or volume corresponding to the acquisition settings along one or more scan planes. The ultrasonic signals may include, for example, one or more reference pulses, imaging pulses, one or more pulsed wave Doppler pulses, and/or the like. At least a portion of the pulsed ultrasonic signals backscatter from the anatomical structure to produce echoes. The echoes are delayed in time and/or frequency according to a depth or movement, and are received by the transducer elements 124 within the transducer array 112. The ultrasonic signals may be used for imaging, for generating and/or tracking shear-waves, for measuring changes in position or velocity within the anatomic structure, differences in compression displacement of the tissue (e.g., strain), and/or for therapy, among other uses. For example, the probe 126 may deliver low energy pulses during imaging and tracking, medium to high energy pulses to generate shear-waves, and high energy pulses during therapy.

The transducer elements 124 convert the received echo signals into electrical signals, which may be received by a receiver 128. The receiver 128 may include one or more amplifiers, an analog to digital converter (ADC), and/or the like. The receiver 128 may be configured to amplify the received echo signals after proper gain compensation and convert these received analog signals from each transducer element 124 to digitized signals sampled uniformly in time. The digitized signals representing the received echoes are stored in memory 106, temporarily. The digitized signals correspond to the backscattered waves received by each transducer element 124 at various times. After digitization, the signals still may preserve the amplitude, frequency, phase information of the backscatter waves.

Optionally, the controller circuit 102 may retrieve the digitized signals stored in the memory 106 to prepare for the beamformer processor 130. For example, the controller circuit 102 may convert the digitized signals to baseband signals or compressing the digitized signals.

The beamformer processor 130 may include one or more processors. Optionally, the beamformer processor 130 may include a central processing unit (CPU), one or more microprocessors, or any other electronic component capable of processing inputted data according to specific logical instructions. Additionally or alternatively, the beamformer processor 130 may execute instructions stored on a tangible and non-transitory computer readable medium (e.g., the memory 106) for beamforming calculations using any suitable beamforming method such as adaptive beamforming, synthetic transmit focus, aberration correction, synthetic aperture, clutter reduction and/or adaptive noise control, and/or the like. Optionally, the beamformer processor 130 may be integrated with and/or a part of the controller circuit 102. For example, the operations described as being performed by the beamformer processor 130 may be configured to be performed by the controller circuit 102.

The beamformer processor 130 performs beamforming on the digitized signals of transducer elements and outputs a radio frequency (RF) signal. The RF signal is then provided to an RF processor 132 that processes the RF signal. The RF processor 132 may include one or more processors. Optionally, the RF processor 132 may include a central processing unit (CPU), one or more microprocessors, or any other electronic component capable of processing inputted data according to specific logical instructions. Additionally or alternatively, the RF processor 132 may execute instructions stored on a tangible and non-transitory computer readable medium (e.g., the memory 106). Optionally, the RF processor 132 may be integrated with and/or a part of the controller circuit 102. For example, the operations described as being performed by the RF processor 132 may be configured to be performed by the controller circuit 102.

The RF processor 132 may generate different ultrasound image data types and/or modes (e.g., B-mode, C-mode, M-mode, color Doppler (e.g., color flow, velocity/power/variance), tissue Doppler, and Doppler energy) for multiple scan planes or different scanning patterns based on the predetermined settings of the first model. For example, the RF processor 132 may generate tissue Doppler data for multi-scan planes. The RF processor 132 gathers the information (e.g., I/Q, B-mode, color Doppler, tissue Doppler, and Doppler energy information) related to multiple data slices and stores the data information, which may include time stamp and orientation/rotation information, in the memory 106.

Alternatively, the RF processor 132 may include a complex demodulator (not shown) that demodulates the RF signal to form IQ data pairs representative of the echo signals. The RF or IQ signal data may then be provided directly to the memory 106 for storage (e.g., temporary storage). Optionally, the output of the beamformer processor 130 may be passed directly to the controller circuit 102.

The controller circuit 102 may be configured to process the acquired ultrasound data (e.g., RF signal data or IQ data pairs) and prepare and/or generate frames of ultrasound image data representing the anatomical structure for display on the display 138. Acquired ultrasound data may be processed in real-time by the controller circuit 102 during the ultrasound exam as the echo signals are received. Additionally or alternatively, the ultrasound data may be stored temporarily in the memory 106 during the ultrasound exam and processed in less than real-time in a live or off-line operation.

The memory 106 may be used for storing processed frames of acquired ultrasound data that are not scheduled to be displayed immediately or to store post-processed images, firmware or software corresponding to, for example, a graphical user interface, one or more default image display settings, programmed instructions, and/or the like. The memory 106 may store the ultrasound images such as 3D ultrasound image data sets of the ultrasound data, where such 3D ultrasound image data sets are accessed to present 2D and 3D images. For example, a 3D ultrasound image data set may be mapped into the corresponding memory 106, as well as one or more reference planes. The processing of the ultrasound data, including the ultrasound image data sets, may be based in part on user inputs, for example, user selections received at the user interface 142.

Figure 2:
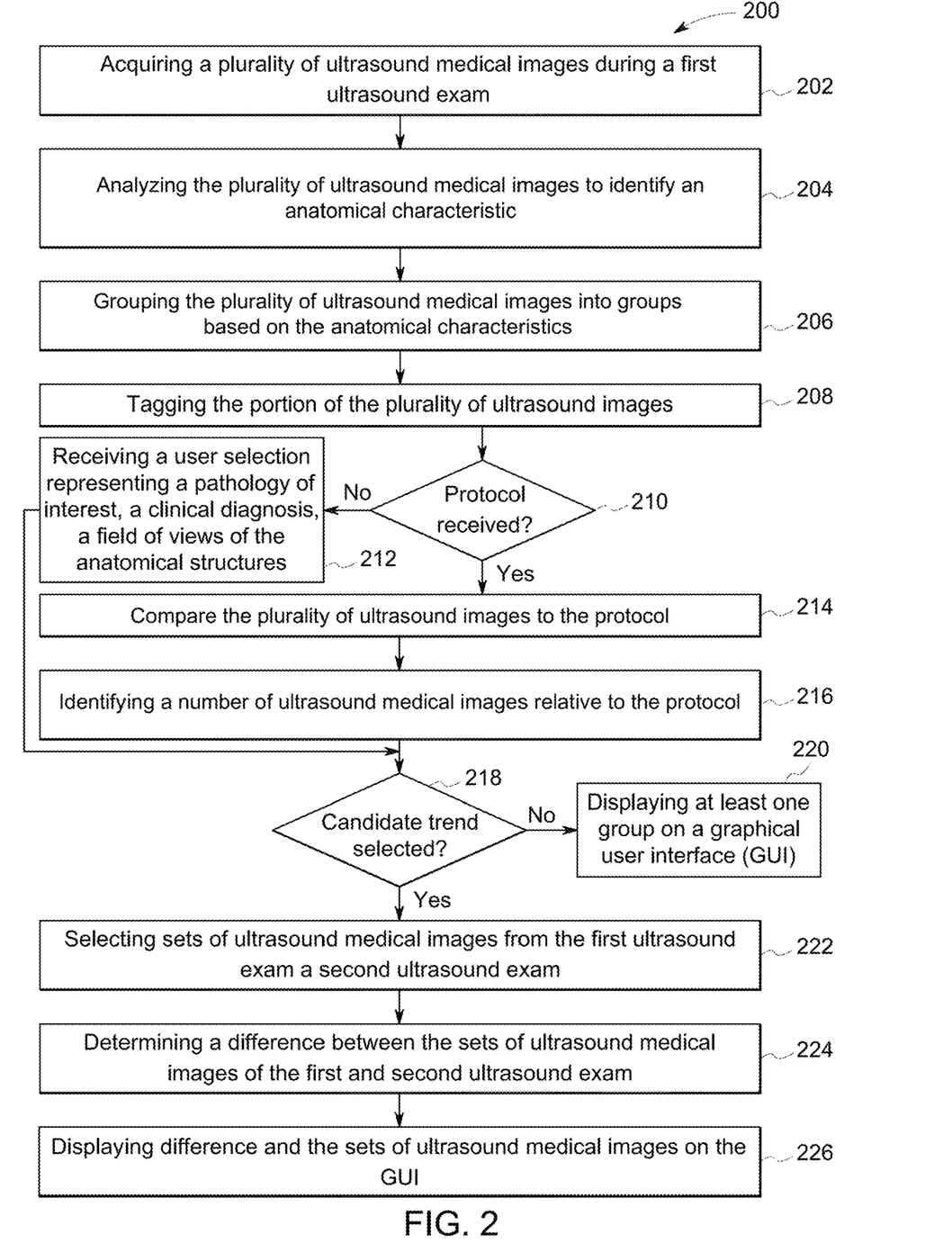
FIG. 2 illustrates a flow chart of an embodiment of a method for grouping a plurality of ultrasound images acquired during an ultrasound exam.

FIG. 2 illustrates a flow chart of an embodiment of a method 200 for grouping a plurality of ultrasound images acquired during an ultrasound exam in accordance with embodiments herein. The method 200, for example, may employ structures or aspects of various embodiments (e.g., systems and/or methods) discussed herein. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. It may be noted that the steps described of the method 200 may be performed during the ultrasound exam in real-time. In various embodiments, portions, aspects, and/or variations of the method 200 may be used as one or more algorithms to direct hardware to perform one or more operations described herein.

Beginning at 202, the controller circuit 102 acquires a plurality of ultrasound images during a first ultrasound exam. For example, the ultrasound probe 126 acquires ultrasound data of the anatomical structure within the patient. During the first ultrasound exam of the patient, the ultrasound probe 126 may emit ultrasound signals from the transducer array 124 at a set rate within the patient. At least a portion of the ultrasound signals are backscattered from the anatomical structure of interest and received by the ultrasound probe 126 via the receiver 128 as ultrasound data. The controller circuit 102 is configured to generate the plurality of ultrasound images of the anatomical structure based on the ultrasound data. The controller circuit 102 may be configured to process the acquired ultrasound data (e.g., RF signal data or IQ data pairs) from the ultrasound probe 126 and prepare and/or generate frames of ultrasound image data. The ultrasound image data represents the plurality of ultrasound images of the anatomical structure.

Optionally, during the first ultrasound exam the clinician may perform anatomical measurements on one or more of the plurality of ultrasound images. The anatomical measurements can be performed using diagnostic measurement tools. The diagnostic measurement tools is presented on a GUI. The diagnostic measurement tools include a plurality of user interface components. The plurality of user interface components represent types of anatomical measurements to be performed by the clinician. For example, the clinician using the user interface 142 may select the diagnostic measurement tools. The controller circuit 102 is configured to display the plurality of user interface components related to the tool on the display 138. The plurality of user interface components enable the clinician to perform one or more anatomical measurements. For example, one of the user interface components represent cursors. The clinician can position the cursors at one or more anatomical characteristics and/or the anatomical structure. The controller circuit 102 calculates a distance between the cursors. The distance can represent a diameter, height, width, and/or the like. The distance can represent the anatomical measurement. The controller circuit 102 stores the anatomical measurements in the memory 106.

Additionally or alternatively, the first ultrasound exam may utilize and/or follow one or more protocols. The protocol can be entered by the clinician. For example, the controller circuit 102 receives a user selection from the user interface 142 indicative of the protocol. The controller circuit 102 can compare the protocol with a protocol database stored in the memory 106. The protocol database may have a plurality of protocols having a pathology of interest, a clinical diagnosis, and/or anatomical structure of interest. The controller circuit 102 may select the protocol in the memory 106 that matches the user selection for the first ultrasound exam. Optionally, the clinician may define the protocol using the user interface 142. For example, the controller circuit 102 may receive user selections from the user interface 142 defining the protocol. Additionally or alternatively, the controller circuit 102 may receive the protocol along the bi-directional communication link from the remote server.

Optionally, the protocol is identified by the controller circuit 102 based on the clinical diagnosis or the pathology of interest. For example, the controller circuit 102 receives a user selection indicative of the clinical diagnosis and/or the pathology of interest from the user interface 142. The controller circuit 102 searches within the protocol database for a protocol that includes an anatomical characteristic or anatomical structure included in the clinical diagnosis or the pathology of interest.

Figure 3:
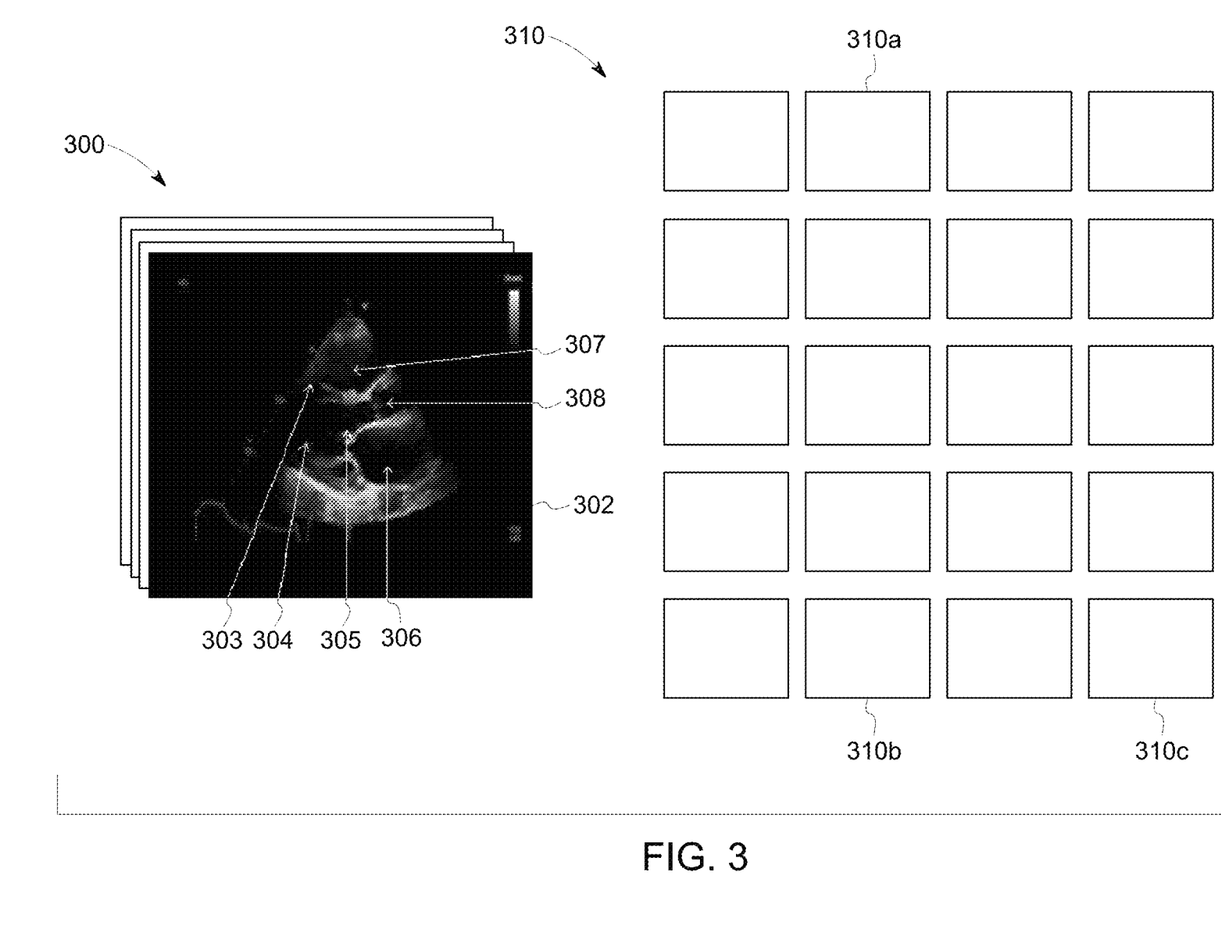
FIG. 3 illustrates an embodiment of a plurality of ultrasound images and groups.

At 204, the controller circuit 102 analyzes the plurality of ultrasound images to identify an anatomical characteristic in the ultrasound images 300. FIG. 3 illustrates the ultrasound images 300 and groups 310. The controller circuit 102 executes the image analysis algorithm stored in the memory 106. The controller circuit 102 identifies one or more anatomical characteristics in at least the ultrasound images 300. For example, the controller circuit 102 identifies one or more anatomical characteristics 303-308 of a select ultrasound image 302. Optionally, the remaining ultrasound images may not include one or more anatomical characteristics and/or the anatomical characteristic was not identified by the controller circuit 102.

The controller circuit 102 can determine a class of the one or more anatomical characteristics 303-308. The controller circuit 102 identifies a size (e.g., dimensions) and location of the one or more anatomical characteristics 303-308 relative to the anatomical structure. For example, the controller circuit 102 identifies the anatomical characteristics 304, 306-308 as chambers based on sizes and a location peripherally with respect to the anatomical structure. The controller circuit 102 determines the class of the anatomical characteristic 305 as an aorta. The controller circuit 102 determines the class of the anatomical characteristic based on a central location of the anatomical characteristic 305 within the anatomical structure.

Additionally or alternatively, the controller circuit 102 identifies the class of the anatomical characteristics 303-304, 306-308 based on a size and/or position. The controller circuit 102 compares a size of the anatomical characteristics 303-304, 306-308 with each other. The controller circuit 102 determines the anatomical characteristic 304 is the largest chamber relative to the anatomical characteristics 306-308. The controller circuit 102 determines that the largest chamber represents the left ventricle. The anatomical characteristic 303 is positioned between the anatomical characteristics 304 and 307. The controller circuit 102 determines that the anatomical characteristic 303 is associated with a mitral valve, which separates the left ventricle (e.g., the anatomical characteristic 304) and the left atrium.

Optionally, the controller circuit 102 determines the view window of the select ultrasound image 302. The controller circuit 102 determines the view window based on the orientation and/or spatial position of the anatomical characteristics 303-308. For example, the controller circuit 102 determined that the anatomical characteristics 304, 306-308 represents four chambers, and the anatomical characteristic 305 represent the aorta of the anatomical structure. The controller circuit 102 compares a position of the anatomical characteristics 304-308 with each other. The controller circuit 102 determines that the position of the anatomical characteristics 304-308 within the select ultrasound image 302 is a parasternal long axis four chamber view window.

The controller circuit 102 can further analyze the ultrasound images 300 to include the pathological (e.g., pathology of interest), the anatomical function, and/or ultrasonic characteristics of the ultrasound images 300.

The anatomical characteristic is indicative of the pathology of interest. The pathology of interest is based on a portion of the anatomical structure having an irregular and/or structural deviation. The portion of the anatomical structure corresponds to the anatomical characteristic analyzed by the controller circuit 102. For example, the pathology of interest may represent valvular stenosis of the mitral valve. The controller circuit 102 analyzes the ultrasound images 300 for the anatomical characteristic that represents the mitral valve corresponding to the pathology of interest.

In another example, the anatomical characteristics is indicative of the anatomical function. The anatomical function can be based on the determination for the clinical diagnosis. Optionally, the anatomical function can be identified by the controller circuit 102 based on the ultrasound image mode of the plurality of ultrasound images. For example, the anatomical function relates to a cardiac function. The controller circuit 102 analyzes the ultrasound images 300 for ultrasonic characteristics that are used to measure the cardiac function. The ultrasonic characteristics representing different pixel colors of the ultrasound image modes used to measure the anatomical function. For example, the controller circuit 102 analyzes the ultrasound images 300 acquired during a Doppler ultrasound image mode (e.g., color flow), the different pixel colors quantify the cardiac function (e.g., blood flow) of the anatomical characteristic.

The controller circuit 102 can be configured to analyze the ultrasound images 300 concurrently, simultaneously, and/or in real-time as the ultrasound images are being acquired.

At 206, the controller circuit 102 groups the ultrasound images 300 into the groups 310 based on the anatomical characteristics (e.g., the anatomical characteristics 303-308). Optionally, the groups 310 may be based on the pathology of interest, the clinical diagnosis, the view windows of the anatomical structure, and/or the like. The controller circuit 102 assigns the ultrasound images 300 into one or more different groups 310. The controller circuit 102 assigns the ultrasound images 300 to corresponding groups 310 based on the anatomical characteristics in the ultrasound images 300.

For example, a portion of the groups 310 may correspond to a pathological (e.g., the pathology of interest) characteristic. The pathology of interest may be received during the first ultrasound exam (e.g., based on the protocol). For example, the pathology of interest can represent an aortic valve. The controller circuit 102 identifies the one or more anatomical characteristics of the ultrasound images 300 that represent the aortic valve into one of the groups 310. For example, a portion of the ultrasound images 300 having the anatomical characteristic representing the aortic valve is assigned by the controller circuit 102 to the group 310a.

Additionally or alternatively, the controller circuit 102 may group the ultrasound images 300 independent of the protocol. For example, the controller circuit 102 may assign the ultrasound images 300 having a common anatomical characteristic into common groups 310.

In another example, a portion of the groups 310 may correspond to the anatomical function. The anatomical function utilized for the clinical diagnosis received during the first ultrasound exam (e.g., based on the protocol). For example, the anatomical function is assessed to determine a disease and/or symptom of the patient for the clinical diagnosis. The anatomical function can be a diastolic function. The controller circuit 102 identifies the one or more anatomical characteristics of the ultrasound images 300 indicative of the diastolic function. The identification of the controller circuit 102 of the one or more anatomical characteristics can be based on a decision tree. The decision tree can be included within the protocol. The decision tree includes view windows of the anatomical structure having an ultrasound image mode, anatomical measurements, and/or the like. The decision tree for the diastolic function can include view windows that include the left ventricle, left atrium, mitral valve, and/or the like. Optionally, the controller circuit 102 may select the ultrasound images 300 that have a corresponding ultrasound image mode based on the anatomical function. For example, the controller circuit 102 may select the ultrasound images that have ultrasound characteristics of the ultrasound image mode of the anatomical function, such as the left ventricle and mitral valve during a Doppler modality and/or M-mode. The controller circuit 102 may assign the anatomical characteristics for the anatomical function to the group 310b.

Additionally or alternatively, the controller circuit 102 may group the ultrasound images 300 independent of the protocol. For example, the controller circuit 102 may assign the ultrasound images 300 representing a common anatomical function into common groups 310.

In another example, a portion of the groups 310 may correspond to the view windows and/or the anatomical measurements. The view windows and/or the anatomical measurements may be based on the protocol. The controller circuit 102 assigns the view windows and/or the anatomical measurements of the protocol to a group 310c.

Additionally or alternatively, the controller circuit 102 may group the ultrasound images 300 independent of the protocol. For example, the controller circuit 102 may assign the ultrasound images 300 representing a common view window into common groups 310.

At 208, the controller circuit 102 tags the ultrasound images 300. The tags represent at least one of the view window, the anatomical structure, a pathology of interest, or the anatomical characteristic of the corresponding ultrasound images 300. The tags can be a graphical icon. The graphical icon includes textual information, numerical information, graphical information, and/or the like. The graphical icon is indicative of the view window, the anatomical structure, the portion of the anatomical structure indicative of the pathology of interest, or the anatomical characteristic of the ultrasound image. The controller circuit 102 adds the tags to one or more of the ultrasound images 300. For example, the controller circuit 102 overlays and/or positions the tag adjacent to one or more of the ultrasound images 300.

At 210, the controller circuit 102 determines whether the protocol was received. For example, the protocol can be received by the controller circuit 102 from the user interface 142. Optionally, the protocol may be received prior to and/or during the first ultrasound exam.

If the protocol was received, then at 214, the controller circuit 102 compares the ultrasound images 300 to the protocol. For example, the controller circuit 102 identifies the view windows and/or the anatomical measurements of the ultrasound images 300. The controller circuit 102 compares the identified view windows and/or the anatomical characteristics with the protocol.

At 216, the controller circuit 102 identifies a number of ultrasound images 300 relative to the protocol. For example, the controller circuit 102 determines a difference between the identified view windows and/or the anatomical measurements of the ultrasound images 300 with the protocol. The difference represents view windows and/or the anatomical measurements of the protocol that have not been acquired. For example, the difference is a number of ultrasound images missing relative to the protocol. Additionally or alternatively, the controller circuit 102 may display which of the view windows and/or the anatomical measurements missing on the display 138. Optionally, the controller circuit 102 may generate a graphical icon such as a bar, a pie chart, a gauge, and/or the like. The graphical icon is indicative on the difference. The graphical icon may be color-coded (e.g., such as green, red) to indicate a progression of a completion of the protocol. Optionally, the graphical icon may include textual information such as a percentage, a ratio or number of acquired view windows and/or anatomical measurements.

If the protocol was not received, then at 212, the controller circuit 102 receives a user selection representing the pathology of interest, the clinical diagnosis, the view window of the anatomical structure. For example, the controller circuit 102 may display a prompt and/or window on the display 138 to request from the clinician the pathology of interest, the clinical diagnosis, the view window of the anatomical structure. The clinician using the user interface 142 can select the pathology of interest, the clinical diagnosis, the view window of the anatomical structure, and/or the like in response to the prompt and/or the window. The selection is received from the user interface 142 by the controller circuit 102.

At 218, the controller circuit 102 determines whether a candidate trend was selected by the clinician. The candidate trend is indicative of a change in at least one of a pathology of interest, an anatomical measurement, or a view window between at least two ultrasound exams. For example, the clinician using the user interface 142 selects a user interface component shown on the displays 138 representing the candidate trend. The controller circuit 102 can determined that the candidate trend was received from the selection of the user interface component by the user interface 142.

Figure 4:
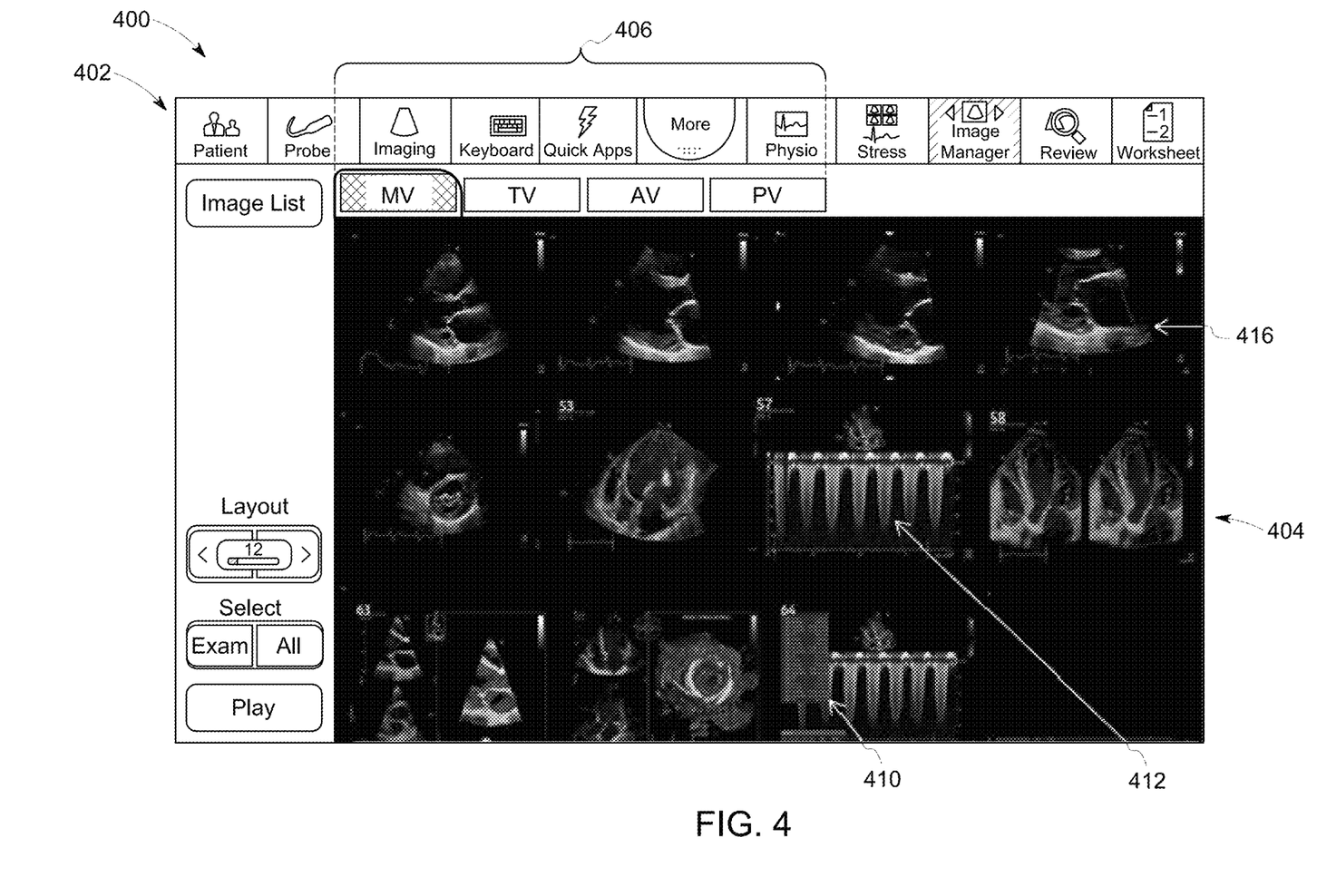
FIG. 4 illustrates an embodiment of a graphical user interface shown on a display.

If the candidate trend was not selected, then at 220, the controller circuit 102 displays at least one group 310 on the GUI 400. FIG. 4 illustrates an embodiment of the GUI 400 shown on the display 138. The GUI 400 includes a plurality of user interface components 404. The user interface components 404 may include a plurality of graphical icons representing the plurality of ultrasound images organized into the corresponding groups 310. Optionally, the user interface components 404 may include the tag information 410. For example, the tag information 410 represents the graphical icon generated by the controller circuit 102 at 208, and overlaid and/or adjacent to the user interface components 404 representing an ultrasound image. Additionally or alternatively, the user interface components 404 may include the anatomical measurements 412, which is shown concurrently with the user interface components 404. The user interface components 404 include the plurality of ultrasound images representing different ultrasound image modes, for example, Doppler or color flow ultrasound image 416. Optionally, the user interface components 404 may be shown as a list, a visual representation of the VW (e.g., a mock-up of a position of the anatomical markers, simulation, of the ultrasound image having the VW), and/or the like.

The groups 310 of the ultrasound images 300 are shown as the user interface components 406. A number of the groups 310 may be based on the one or more protocols and/or the selection (e.g., the pathology of interest, the clinical diagnosis, the view window of the anatomical structure) by the clinician at 212. For example, the first ultrasound exam may include the one or more protocols for acquiring different anatomical characteristics, such as valves, of the anatomical structure. The user interface components 406 represent different valves identified by the controller circuit 102 from the portion of ultrasound images 300.

For example, the controller circuit 102 grouped the portion of ultrasound images 300 into four groups 310, such as a mitral valve, a tricuspid valve, aortic valve, and pulmonic valve. The four groups 310 can be based on the anatomical characteristics identified by the controller circuit 102. Optionally, the user interface components 406 may be utilized by the clinician to adjust an order and/or filter the user interface components 404. For example, the controller circuit 102 may display the user interface components 404 corresponding to a selected group. The controller circuit 102 determines which group 310 is selected based on a selection of one of the user interface components 406. When one of the user interface components 406 is selected, the controller circuit 102 may adjust a position and/or filter the user interface components 404. The user interface components 404 are adjusted and/or filtered such that only the user interface components 404 corresponding to the selected user interface component 406 are displayed. For example, the GUI 400 shows the mitral valve is selected from the user interface components 406. The controller circuit 102 displays the portion of ultrasound images 300 that are grouped or have the anatomical characteristic representing the mitral valve.

If the candidate trend was selected, then at 222, the controller circuit 102 selects sets of ultrasound images from the first ultrasound exam and a second ultrasound exam. The second ultrasound exam may represent a plurality of ultrasound images. The second ultrasound exam is temporally different than the first ultrasound exam. The plurality of ultrasound images may be stored in the memory 106 and/or accessed by the controller circuit 102 from the remote server via the bi-directional communication link.

Additionally or alternatively, the second ultrasound exam may be selected by the clinician. For example, the controller circuit 102 may identify a number of previous ultrasound exams of the patient. The clinician may select one or more of the previous ultrasound exams as the second ultrasound exam from the user interface 142.

Optionally, the plurality of ultrasound images of the second ultrasound exam have not been analyzed by the controller circuit 102. For example, the plurality of ultrasound images have not been grouped based on the anatomical characteristics. The candidate trend is indicative of change in at least one of the pathology of interest or the anatomical measurement. To determine the change in the pathology of interest or the anatomical measurement, the controller circuit 102 groups the plurality of ultrasound images by performing the method 200 at operations 204-208.

The controller circuit 102 selects sets of the portion of ultrasound images 300 of the first and second ultrasound exams based on the candidate trend. The sets of the plurality of ultrasound images may be defined based on the candidate trend. For example, the sets represent the pathology of interest or the anatomical characteristic corresponding to the anatomical measurement of the candidate trend.

At 224, the controller circuit 102 determines a difference between the sets of ultrasound images of the first and second ultrasound exams. The controller circuit 102 may select pairs of the ultrasound images from the sets of ultrasound images based on the candidate trend. For example, the controller circuit 102 compares the sets of ultrasound images with each other to identify pairs of the ultrasound images that have the same view window, the anatomical function, the anatomical characteristic, and/or have the same anatomical characteristics corresponding to the pathology of interest. The identified pairs of the ultrasound images are compared by the controller circuit 102 to determine a difference between the first and second ultrasound exams.

For example, the controller circuit 102 compares the anatomical characteristic in the pairs of the ultrasound images. The controller circuit 102 identifies differences in a size, shape, dimensions, and/or the like of the anatomical characteristic between the pairs of medical images In another example, the controller circuit 102 identifies differences in the anatomical measurements of the anatomical characteristic between the pairs of the ultrasound images of the first and second ultrasound exams. The controller circuit 102 compares the anatomical measurement of the pairs to determine a difference between the anatomical measurements. For example, the difference may represent a difference in anatomical measurements between the first and second ultrasound exams.

Additionally or alternatively, the trend may represent changes in the anatomical function of the anatomical structure. For example, the controller circuit 102 compares the ultrasonic characteristics between the pairs of ultrasound images of the first and second ultrasound exams. The ultrasonic characteristics may correspond to differences in pixels of the ultrasound image mode of the pairs of the ultrasound images. For example, the anatomical function may be the cardiac function of the anatomical structure. The pairs of the ultrasound images were acquired during the Doppler ultrasound image mode (e.g., Doppler or color flow ultrasound image 416). The controller circuit 102 compares the pixel colors representing the different quantified cardiac functions of the anatomical structure to determine a difference between the anatomical functions. For example, the difference may represent the difference in the quantified cardiac functions between the first and second ultrasound exams.

Figure 5:
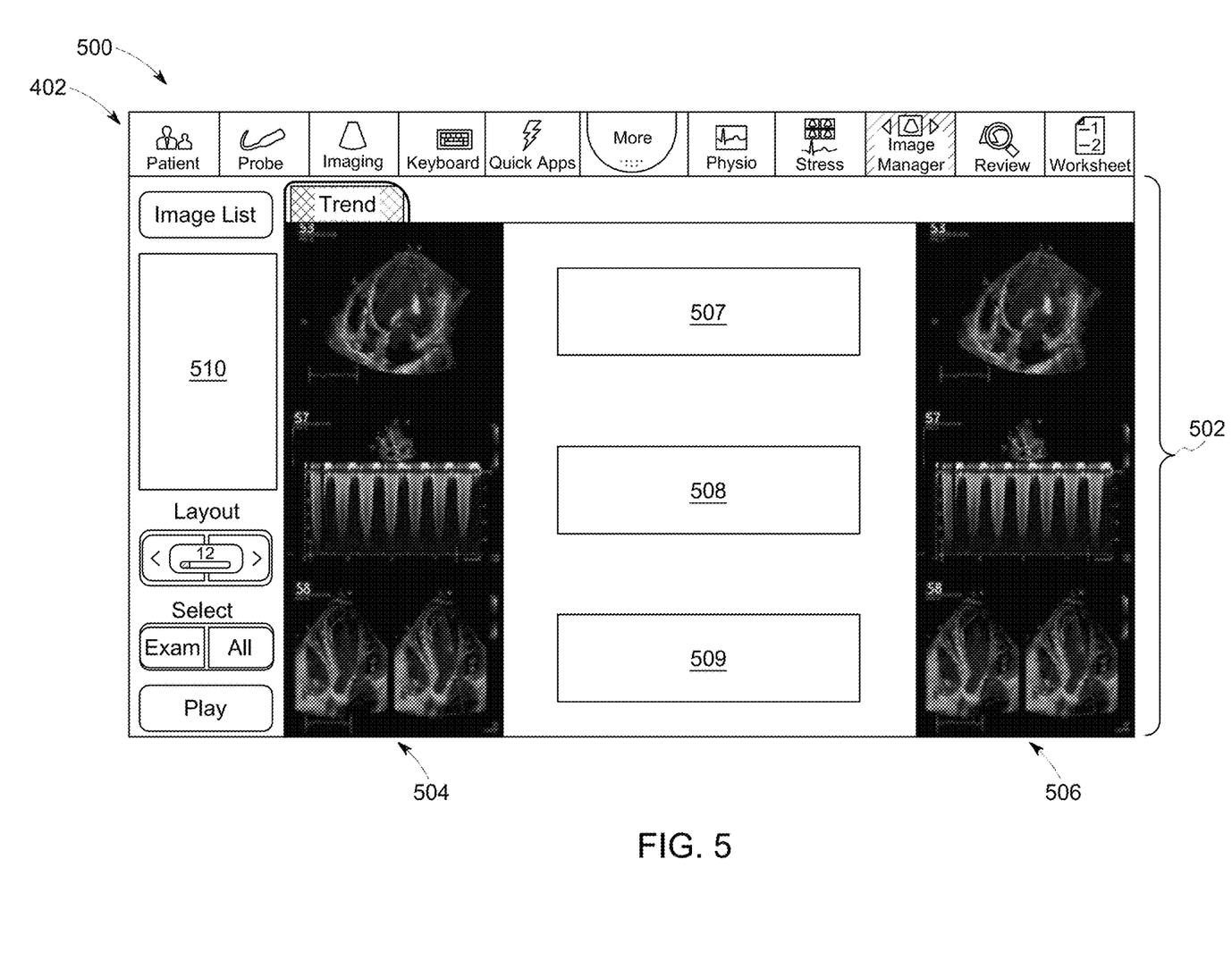
FIG. 5 illustrates an embodiment of a graphical user interface shown on a display.

At 226, the controller circuit 102 displays the difference and the sets of ultrasound images on a GUI 500. FIG. 5 illustrates an embodiment of the GUI 500 on the display 138. The GUI 500 includes the user interface components 402 and 502. The user interface components 502 may include a plurality of graphical icons representing the plurality of ultrasound images organized into sets of ultrasound images 504, 506. The set of ultrasound images 504 represent the ultrasound images acquired during the first ultrasound exam. The set of ultrasound images 506 represents the ultrasound images acquired during the second ultrasound exam. The sets of ultrasound images 504, 506 are grouped in to pairs of medical images.

The user interface components 502 include difference windows 507-509. The difference windows 507-509 may include textual, numerical, and/or graphical information indicating a difference between the pairs of medical images. For example, the difference windows 507-509 indicate the difference between the pairs of medical images representing the sets of ultrasound images 504, 506.

Additionally or alternatively, the user interface component 402 may include an overall difference window 510 generated by the controller circuit 102. The overall difference window 510 includes textual, numerical, and/or graphical information indicating a difference between the first and second ultrasound exam among the sets of ultrasound images 504, 506.

In an embodiment a method is provided. The method includes acquiring a plurality of ultrasound images of an anatomical structure during a first ultrasound exam based on ultrasound data received from an ultrasound probe. The method includes analyzing the ultrasound images to identify an anatomical characteristic in the ultrasound images, grouping the ultrasound images into groups based on the anatomical characteristic, and displaying at least one group of the ultrasound images on a graphical user interface (GUI).

Optionally, the anatomical characteristic of the analyzing operation is indicative of a pathology of interest or an anatomical function of the anatomical structure.

Optionally, the analyzing operation includes identifying the anatomical structure within the ultrasound images and determining an orientation of the anatomical structure associated with a view window.

Optionally, the grouping operation is further based on at least one of i) a pathology of interest, ii) an anatomical function, or iii) view windows of the anatomical structure.

Optionally, the method includes tagging the ultrasound images based on at least one of a view window, the anatomical structure, a pathology of interest, or the anatomical characteristic of a first ultrasound image.

Optionally, the method includes selecting a first set of ultrasound images of the ultrasound images and a second set of ultrasound images from a second ultrasound exam based on a candidate trend. The candidate trend being indicative of a change in at least one of a pathology of interest, an anatomical measurement, an anatomical function, or a view window. The method includes determining a difference between the first and second sets of ultrasound images.

Optionally, the method includes comparing the ultrasound images to a protocol. The protocol including a plurality of view windows of an anatomical structure. The method includes identifying a number of ultrasound images relative to the protocol.

Optionally, the anatomical structure includes at least one of a heart, a bone, a brain, a head, a bladder, a kidney, a liver, or a vascular structure.

In an embodiment a medical imaging system is provided. The system includes an ultrasound probe configured to acquire ultrasound data of an anatomical structure. The system includes a display and a controller circuit. The controller circuit is configured to acquire a plurality of ultrasound images during a first ultrasound exam based on ultrasound data received from an ultrasound probe, analyze the ultrasound images to identify an anatomical characteristic in the ultrasound images, group the ultrasound images into groups based on the anatomical characteristics, and display at least one group on a graphical user interface (GUI).

Optionally, the controller circuit is configured to analyze the ultrasound images to identify the anatomical characteristic, which is indicative of a pathology of interest or an anatomical function of the anatomical structure.

Optionally, the controller circuit is configured to identify an anatomical structure within the ultrasound images and determine an orientation of the anatomical structure associated with a view window.

Optionally, the controller circuit is configured to group the portion of ultrasound images further based on at least one of i) a pathology of interest, ii) an anatomical function, or iii) view windows of the anatomical structure.

Optionally, the controller circuit is configured to tag the portion of ultrasound images based on at least one of a view window, an anatomical structure, an anatomical function, a pathology of interest, or an anatomical characteristic of a first ultrasound image.

Optionally, the system includes a user interface. The controller circuit is configured to receive a candidate trend from the user interface. The candidate trend is indicative of a change in at least one of a pathology of interest, an anatomical measurement, or a view window. Additionally or alternatively, the controller circuit is configured to select a first set of ultrasound images based on the candidate trend from the first ultrasound exam and a second set of ultrasound images from a second ultrasound exam. The controller circuit is further configured to determine a difference between the first and second set of ultrasound images.

Optionally, the controller circuit is configured to compare the ultrasound images to a protocol. The protocol including a plurality of field of views of an anatomical structure, and identify a number of ultrasound images missing relative to the protocol.

Optionally, the anatomical structure includes at least one of a heart, a bone, a brain, a head, a bladder, a kidney, a liver, or a vascular structure.

In an embodiment, a tangible and non-transitory computer readable medium that includes one or more programmed instructions is provided. The one or more programmed instructions are configured to direct one or more processors to acquire a plurality of ultrasound images during an ultrasound exam based on ultrasound data received from an ultrasound probe, analyze the ultrasound images to identify an anatomical characteristic in the ultrasound images, group the ultrasound images into groups based on the anatomical characteristics, and display at least one group on a graphical user interface (GUI).

Optionally, the one or more processors are directed to analyze the ultrasound images to identify the anatomical characteristic, which is indicative of a pathology of interest or an anatomical function of the anatomical structure.

Optionally, the one or more processors are directed to group the ultrasound images based on at least one of i) a pathology of interest, ii) an anatomical function, or iii) view windows of the anatomical structure.

It may be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid-state drive, optical disk drive, and the like. The storage device may also be other similar means for loading computer programs or other instructions into the computer or processor.

As used herein, the term "computer," "subsystem," "controller circuit," "circuit," or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "controller circuit".

The computer, subsystem, controller circuit, circuit execute a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, subsystem, controller circuit, and/or circuit to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a controller circuit, circuit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f) unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A computer implemented method, comprising:
   acquiring a plurality of ultrasound images of an anatomical structure during a first ultrasound exam based on ultrasound data received from an ultrasound probe;
   analyzing the ultrasound images to identify one or more anatomical characteristics in the ultrasound images, wherein the one or more anatomical characteristics include at least one structural feature of the anatomical structure;
   grouping the ultrasound images into groups based on the one or more anatomical characteristics so that a first group of the groups corresponds to a first structural feature of the anatomical structure, wherein the ultrasound images in the first group depict either (i) the first structural feature in multiple different scanning modes, (ii) the first structural feature in multiple different view windows, or (iii) the first structural feature in multiple different scanning modes and in multiple different view windows;
   displaying the ultrasound images of at least one of the groups on a graphical user interface (GUI);
   comparing the ultrasound images to a protocol;
   identifying anatomical measurements performed on the ultrasound images; and
   determining a difference between i) the anatomical measurements performed on the ultrasound images and ii) anatomical measurements associated with the protocol, the difference representing one or more of anatomical measurements or an identified view window of the protocol that have not been acquired.

2. The computer implemented method of claim 1, wherein the analyzing operation includes identifying the first structural feature of the anatomical structure within the ultrasound images and determining an orientation of the first structural feature associated with one of the different view windows, wherein the grouping is also based on the orientation.

3. The computer implemented method of claim 1, wherein the grouping operation is based on the different view windows of the anatomical structure.

4. The computer implemented method of claim 1, further comprising tagging the ultrasound images based on the at least one structural feature and at least one of a view window of the respective ultrasound image or a pathology of interest.

5. The computer implemented method of claim 1, further comprising:
   selecting a first set of ultrasound images of the ultrasound images and a second set of ultrasound images from a second ultrasound exam based on a candidate trend, wherein the candidate trend is indicative of a change in at least one of a pathology of interest, an anatomical measurement, an anatomical function, or a view window; and
   determining a difference between the first and second sets of ultrasound images.

6. The computer implemented method of claim 1, wherein the protocol includes a plurality of view windows of the anatomical structure, and the method comprises determining one or more of the view windows of the protocol not yet acquired.

7. A medical imaging system comprising:

an ultrasound probe configured to acquire ultrasound data of an anatomical structure;

a display; and a controller circuit configured to:

acquire a plurality of ultrasound images during a first ultrasound exam based on ultrasound data received from an ultrasound probe;

analyze the ultrasound images to identify one or more anatomical characteristics in the ultrasound images, wherein the one or more anatomical characteristics include at least one structural feature of an anatomical structure;

group the ultrasound images into groups based on the one or more anatomical characteristics so that a first group of the groups corresponds to a first structural feature of the anatomical structure, wherein the ultrasound images in the first group depict either (i) the first structural feature in multiple different scanning modes, (ii) the first structural feature in multiple different view windows, or (iii) the first structural feature in multiple different scanning modes and in multiple different view windows;

display the ultrasound images of at least one of the groups on a graphical user interface (GUI);

compare the ultrasound images to a protocol;

identify anatomical measurements performed on the ultrasound images; and determine a difference between i) the anatomical measurements performed on the ultrasound images and ii) anatomical measurements associated with the protocol, the difference representing one or more of anatomical measurements or an identified view window of the protocol that have not been acquired.

8. The medical imaging system of claim 7, wherein the first structural feature of the anatomical structure is a valve of a heart.

9. The medical imaging system of claim 7, wherein the controller circuit is configured to identify the first structural feature of the anatomical structure within the ultrasound images and determine an orientation of the first structural feature associated with one of the different view windows, wherein the grouping is also based on the orientation.

10. The medical imaging system of claim 7, wherein the controller circuit is configured to tag the ultrasound images based on at least one of a view window of the respective ultrasound image, the at least one structural feature of the anatomical structure, an anatomical function, a pathology of interest, or an anatomical characteristic of a first ultrasound image.

11. The medical imaging system of claim 7, wherein the controller circuit is configured to select, based on a candidate trend received from a user interface, a first set of ultrasound images from the first ultrasound exam and a second set of ultrasound images from a second ultrasound exam, and to determine a difference between the first and second sets of ultrasound images indicative of a change in at least one of a pathology of interest, an anatomical measurement, or a view window.

12. The medical imaging system of claim 7, wherein the protocol includes a plurality of view windows of the anatomical structure, and the controller circuit is configured to determine one or more of the view windows of the protocol not yet acquired.

13. The computer implemented method of claim 1, further comprising:

displaying user interface components on the GUI corresponding to different respective ones of the groups, including the first group, and displaying the ultrasound images of the first group on the GUI in response to receiving a user input which selects a first user interface component corresponding to the first group.

14. The computer implemented method of claim 1, wherein the at least one structural feature includes multiple vascular structures of a heart, the vascular structures comprising one or more of valves, arteries, or veins, and the grouping operation includes grouping the ultrasound images into the groups corresponding to the different vascular structures of the heart.

15. The computer implemented method of claim 14, further comprising displaying user interface components on the GUI corresponding to different respective ones of the groups corresponding to the different vascular structures of the heart.

16. The computer implemented method of claim 1, wherein grouping the ultrasound images comprises grouping the ultrasound images into a second group which corresponds to an anatomical function, wherein the anatomical characteristics of the ultrasound images in the second group are indicative of the anatomical function.

17. The computer implemented method of claim 1, wherein the ultrasound images are grouped such that the ultrasound images in the first group depict either (i) the first structural feature in multiple different scanning modes, or (iii) the first structural feature in multiple different scanning modes and in multiple different view windows.

* * * * *